United States Patent
Han et al.

(10) Patent No.: US 12,372,618 B2
(45) Date of Patent: Jul. 29, 2025

(54) DISTANCE MEASURING DEVICE AND MEASURING METHOD BY USING VISIBLE LASER AND NEAR-INFRARED PULSE LASER

(71) Applicant: KOREA INSTITUTE OF MACHINERY & MATERIALS, Daejeon (KR)

(72) Inventors: Seong Heum Han, Daejeon (KR); Seung Man Kim, Daejeon (KR); Jeong Seok Oh, Daejeon (KR); Seung Kook Ro, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 1113 days.

(21) Appl. No.: 17/292,061

(22) PCT Filed: Nov. 1, 2019

(86) PCT No.: PCT/KR2019/014686
§ 371 (c)(1),
(2) Date: May 7, 2021

(87) PCT Pub. No.: WO2020/101233
PCT Pub. Date: May 22, 2020

(65) Prior Publication Data
US 2021/0396848 A1    Dec. 23, 2021

(30) Foreign Application Priority Data
Nov. 13, 2018  (KR) .................. 10-2018-0139418

(51) Int. Cl.
*G01S 7/481*    (2006.01)
*G01S 7/484*    (2006.01)
(Continued)

(52) U.S. Cl.
CPC ............ *G01S 7/4811* (2013.01); *G01S 7/484* (2013.01); *G01S 17/89* (2013.01); *G01S 7/4861* (2013.01)

(58) Field of Classification Search
CPC ...................................... G01S 17/89
See application file for complete search history.

(56) References Cited

U.S. PATENT DOCUMENTS 9,225,959 B2 * 12/2015 Choi ................ G01S 17/08
2014/0071432 A1 *  3/2014 Dunne ............... G01S 7/497
                                                         356/5.01
2015/0029490 A1 *  1/2015 Horibe ............. G02B 26/0833
                                                         356/5.01

FOREIGN PATENT DOCUMENTS

| JP | 2013195117 A | * 9/2013 |
| JP | 2017195569 | 10/2017 |
| KR | 1019870004316 | 5/1987 |
| KR | 1019930020170 | 10/1993 |

(Continued)

OTHER PUBLICATIONS

E. Acosta and K. Iga, "Design of a wavelength multiplexer-demultiplexer by the use of planar microlenses," Appl. Opt. 33, 3415-3419 (1994) (Year: 1994).*

(Continued)

*Primary Examiner* — Hovhannes Baghdasaryan
*Assistant Examiner* — Clara G Chilton
(74) *Attorney, Agent, or Firm* — LEX IP MEISTER, PLLC

(57) ABSTRACT

A distance measuring device of the present disclosure is a device measuring a distance to a target, and includes: a near-infrared laser optical system generating a near-infrared laser pulse having a predetermined NAR (Non-Ambiguity Range) value to be emitted toward a target and receiving the near-infrared laser pulse reflected from the target to be converted into a near-infrared electrical signal, a visible laser optical system generating visible laser light to be (Continued)

emitted toward the target and receiving the visible laser light reflected from the target to be converted into a visible electrical signal, and a calculator calculating a first distance value from the visible electrical signal to obtain a number of repetitions of the NAR while measuring a distance to the target and using a second distance value calculated from the number of repetitions and the near-infrared electrical signal to obtain a distance to the target.

18 Claims, 7 Drawing Sheets

(51) Int. Cl.
  *G01S 7/4861* (2020.01)
  *G01S 17/89* (2020.01)

(56) References Cited

FOREIGN PATENT DOCUMENTS

| | | |
|---|---|---|
| KR | 1019970022387 | 5/1997 |
| KR | 10-2012-0007735 | 1/2012 |
| KR | 101529513 | 6/2015 |
| KR | 1020150091779 | 8/2015 |
| KR | 101589644 | 1/2016 |
| KR | 10-2016-0069404 | 6/2016 |
| KR | 10-2016-0114445 | 10/2016 |
| KR | 1020160145536 | 12/2016 |
| KR | 10-1896477 | 9/2018 |
| WO | 2017206522 | 12/2017 |

OTHER PUBLICATIONS

KIPO, PCT Search Report of PCT/KR2019/014686 dated Feb. 13, 2020.

* cited by examiner

DISTANCE MEASURING DEVICE AND MEASURING METHOD BY USING VISIBLE LASER AND NEAR-INFRARED PULSE LASER

TECHNICAL FIELD

The present invention relates to a distance measuring device and a method for measuring a distance of a target by using a laser, and more specifically to a distance measuring device and a measuring method by using a visible laser and a near-infrared pulse laser.

BACKGROUND ART

A distance measuring technology using a laser technology that measures a distance to a target by irradiating a pulse light such as a laser light toward a target, receiving a reflected pulse light of which the pulse light is reflected from the target by an optical system such as a convex lens or concave mirror, and detecting a delay time required from the irradiation of such pulse light to the light receiving.

In the near-infrared pulse laser, many distance measuring technologies are being developed due to the development of optical components in the near-infrared wavelength band, the development of laser technologies such as a femtosecond laser and excellent characteristics of near-infrared pulse laser. The distance measuring devices using the near-infrared pulse lasers are developing in a direction that expands an area that may be measured without an ambiguity while improving a resolution. The distance measuring devices using the near-infrared pulse lasers have a lower resolution than a laser interferometer with a nanometer-level resolution, but there is a merit that the area to be measured without the ambiguity is longer than the laser interferometer.

However, since the distance measuring device using the near-infrared pulse laser uses the laser in the wavelength range that is invisible to a human eye, there is a difficulty in alignment during an installation of the device and safety issues such as an entering of the laser light to the human eye may occur. In addition, in the near-infrared pulse laser, a measuring ambiguity occurs due to a repetitive characteristic of the laser pulse, resulting in an ambiguity problem in that the number of solutions that the measured distance values may have is numerous.

DISCLOSURE

Technical Problem

An aspect of the present invention is to provide a distance measuring device and a distance measuring method capable of extending an area where a distance measurement is possible without an ambiguity by adding and applying a visible laser to a near-infrared pulse laser distance measuring device.

Another aspect of the present invention is to provide a distance measuring device and a distance measuring method capable of improving a distance measuring resolution by configuring an additional laser interferometer to the near-infrared pulse laser distance measuring device.

Another aspect of the present invention is to provide a distance measuring device and a distance measuring method that improves convenience and safety in use by using a visible light as a guide beam in the near-infrared pulse laser distance measuring device.

However, the problems to be solved by the embodiments of the present invention are not limited to the above-described problems and may be variously expanded within the scope of the technical idea included in the present invention.

Technical Solution

A distance measuring device of the present disclosure as a device measuring a distance to a target includes: a near-infrared laser optical system generating a near-infrared laser pulse having a predetermined NAR (Non-Ambiguity Range) value to be emitted toward a target and receiving the near-infrared laser pulse reflected from the target to be converted into a near-infrared electrical signal; a visible laser optical system generating visible laser light to be emitted toward the target and receiving the visible laser light reflected from the target to be converted into a visible electrical signal; and a calculator calculating a first distance value from the visible electrical signal to obtain a number of repetitions of the NAR while measuring a distance to the target and using a second distance value calculated from the number of repetitions and the near-infrared electrical signal to obtain a distance to the target. The calculator may calculate the distance to the target by adding the value calculated by multiplying the NAR value by the number of repetitions to the second distance value.

That is, in the calculator, the visible electrical signal is provided from the visible laser optical system to obtain a first distance value ~D of a first precision and to calculate an integer value n of a number of repetitions according to Equation 1 below, and the near-infrared electrical signal is provided from the near-infrared laser optical system to obtain a second distance value d of a second precision higher than the first precision and to calculate an actual distance D according to Equation 2 below.

$$n = [\sim D / \text{NAR}] \quad (1)$$

$$D = n \times \text{NAR} + d \quad (2)$$

Here, [ ] is a floor function, the value ~D is the distance measured in the visible laser optical system, the NAR is a non-ambiguity range constant of the near-infrared laser optical system, the value D is the actual distance, and the value d is the distance measured in the near-infrared laser optical system.

The near-infrared laser optical system may include: a near-infrared pulse laser generating the near-infrared laser pulse to be emitted; a first light coupler passing the emitted near-infrared laser pulse and receiving the reflected near-infrared laser pulse to change an optical path; and a signal detector receiving the reflected near-infrared laser pulse to generate and transmit the near-infrared electrical signal to the calculator.

The distance measuring device may further include a second light coupler combining the near-infrared laser pulse emitted from the near-infrared laser optical system and the visible laser light emitted from the visible laser optical system to be irradiated to the target and receiving light reflected from the target to be divided into and transmit the near-infrared laser pulse and the visible laser light.

The visible laser optical system may include: a visible laser generating and emitting the visible laser light; a third light coupler passing the emitted visible laser light and receiving the reflected visible laser light to change an optical path; a light detector receiving the reflected visible laser light transmitted from the third light coupler to generate the visible electrical signal; a function generator generating a predetermined electrical signal waveform to be provided to the visible laser; and a delay time detector receiving the visible electrical signal from the light detector and receiving the electrical signal waveform or generation timing thereof from the function generator to calculate and transmit a delayed time of the visible electrical signal to the calculator.

The distance measuring device according to another embodiment may further include a first light divider passing the near-infrared laser pulse emitted from the near-infrared laser optical system, and reflecting the visible laser light emitted from the visible laser optical system.

The near-infrared laser optical system may include: a near-infrared pulse laser generating the near-infrared laser pulse to be emitted; a second light divider reflecting a part of the emitted near-infrared laser pulse to be transmitted to the reference plane mirror, passing the other part to be irradiated to the target, and receiving the near-infrared laser pulse reflected from the target to change an optical path; and a signal detector receiving the near-infrared laser pulse reflected from the target and the near-infrared laser pulse reflected from the reference plane mirror to generate and transmit the near-infrared electrical signal to the calculator.

The visible laser optical system may include: a visible laser generating and emitting the visible laser light; a third light divider reflecting the emitted visible laser light and passing the reflected visible laser light; a light detector receiving the reflected visible laser light transmitted from the third light divider to generate the visible electrical signal; a function generator generating a predetermined electrical signal waveform to be provided to the visible laser; and a delay time detector receiving the visible electrical signal from the light detector and receiving the electrical signal waveform or generation timing thereof from the function generator to calculate and transmit a delayed time of the visible electrical signal to the calculator.

A distance measuring method according to an embodiment of the present invention as a method measuring a distance to a target may include: generating a near-infrared laser pulse having a predetermined NAR (Non-Ambiguity Range) value to be emitted toward a target and receiving the near-infrared laser pulse reflected from the target to be converted into a near-infrared electrical signal; generating visible laser light to be emitted toward the target and receiving the visible laser light reflected from the target to be converted into a visible electrical signal; and calculating a first distance value from the visible electrical signal to obtain a number of repetitions of the NAR while measuring a distance to the target and using a second distance value calculated from the number of repetitions and the near-infrared electrical signal to obtain a distance to the target.

A distance measuring device according to another embodiment of the present invention as a device measuring a distance to a target may include: a near-infrared laser optical system generating a near-infrared laser pulse to be emitted toward the target and receiving a near-infrared laser pulse reflected from the target to be converted into a near-infrared electrical signal; a visible laser optical system generating visible laser light having a predetermined NAR (Non-Ambiguity Range) value to emit at least a part toward the target and reflecting at least another part from a reference plane mirror and converting an interference signal of which the visible laser light reflected from the target is interfered with the visible laser light reflected from the reference plane mirror into the visible electrical signal; and a calculator calculating a second distance value from the near-infrared electrical signal to calculate a number of repetitions of the NAR while measuring the distance to the target and calculating a distance to the target by using the number of repetitions and a third distance value calculated from the visible electrical signal. The calculator may calculate the distance to the target by adding the value calculated by multiplying the NAR value by the number of repetitions to the third distance value.

That is, in the calculator, the near-infrared electrical signal may be provided from the near-infrared laser optical system to obtain a second distance value ~D' of a second precision and to calculate an integer value n of a number of repetitions according to Equation 3, and a third distance value d' of a third precision higher than the second precision obtained from the visible electrical signal may be provided from the visible laser optical system to calculate an actual distance D' according to Equation 4.

$$n=[\sim D'/\text{NAR}'] \quad (3)$$

$$D'=n\times\text{NAR}+d' \quad (4)$$

Here, [ ] is a floor function, the value ~D' is the distance measured in the near-infrared laser optical system, the NAR' is a is a non-ambiguity range constant of the visible laser optical system, the value D' is the actual distance, and the value d' is the distance measured in the visible laser optical system.

The near-infrared laser optical system may include: a near-infrared pulse laser generating and emitting the near-infrared laser pulse; a first light coupler passing the emitted near-infrared laser pulse and receiving the reflected near-infrared laser pulse to change an optical path; and a signal detector receiving the reflected near-infrared pulse laser of which the path is changed in the first light coupler and generating the near-infrared electrical signal to be transmitted to the calculator.

The distance measuring device may further include a second light coupler combining the near-infrared laser pulse emitted from the near-infrared laser optical system and the visible laser light emitted from the visible laser optical system to be irradiated to the target; and receiving the light reflected from the target to be divided into and transmit the near-infrared laser pulse and the visible laser light.

The visible laser optical system may include: a visible laser generating and emitting the visible laser light; a third light coupler passing the emitted visible laser light and receiving the visible laser light reflected from the target to change an optical path; a light detector converting an interference signal of which the visible laser light reflected from the reference plane mirror and the visible laser light reflected from the target are received and interfered into the visible electrical signal; and an interference signal analyzer receiving the visible electrical signal from the light detector to calculate and provide the third distance value to the calculator.

The distance measuring device according to another embodiment of the present invention may further include a first light divider passing the near-infrared laser pulse emitted from the near-infrared laser optical system, and reflecting the visible laser light emitted from the visible laser optical system.

The near-infrared laser optical system may include: a near-infrared pulse laser generating and emitting the near-infrared laser pulse; a second light divider reflecting a part of the emitted near-infrared laser pulse to be transmitted to the reference plane mirror, passing another part to be irradiated to the target, and receiving the reflected near-infrared laser pulse from the target to change an optical path; and a signal detector receiving the near-infrared laser pulse reflected from the target and the near-infrared laser pulse reflected from the reference plane mirror to generate and transmit the near-infrared electrical signal to the calculator.

The visible laser optical system may include: a visible laser generating and emitting the visible laser light; a second light divider reflecting a part of the emitted visible laser light to be transmitted to the reference plane mirror and passing another part to be irradiated to the target; a third light divider reflecting the emitted visible laser light and passing the visible laser light respectively reflected from the reference plane mirror and from the target; a light detector converting an interference signal of which the visible laser light respectively reflected from the reference plane mirror and the target is received and interfered into the visible electrical signal; and an interference signal analyzer receiving the visible electrical signal from the light detector to calculate and transmit the third distance value to the calculator.

A distance measuring method according to another embodiment of the present invention as a method measuring a distance to a target may include: generating a near-infrared laser pulse to be emitted toward the target and receiving a near-infrared laser pulse reflected from the target to be converted into a near-infrared electrical signal; generating visible laser light having a predetermined NAR (Non-Ambiguity Range) value to emit at least a part toward the target and reflecting at least another part from a reference plane mirror and converting an interference signal of which the visible laser light reflected from the target is interfered with the visible laser light reflected from the reference plane mirror into the visible electrical signal; and calculating a second distance value from the near-infrared electrical signal to calculate a number of repetitions of the NAR while measuring the distance to the target and calculating a distance to the target by using the number of repetitions and a third distance value calculated from the visible electrical signal.

Advantageous Effects

According to the distance measuring device according to an embodiment of the present invention, it is possible to measure the long distance without ambiguity by additionally using a beam in a visible light area, and it is convenient to use and has an effect of preventing safety accidents.

In addition, by applying a laser interferometer to the near-infrared pulse laser, a long distance may be measured with high resolution.

MODE FOR INVENTION

Figure 1:
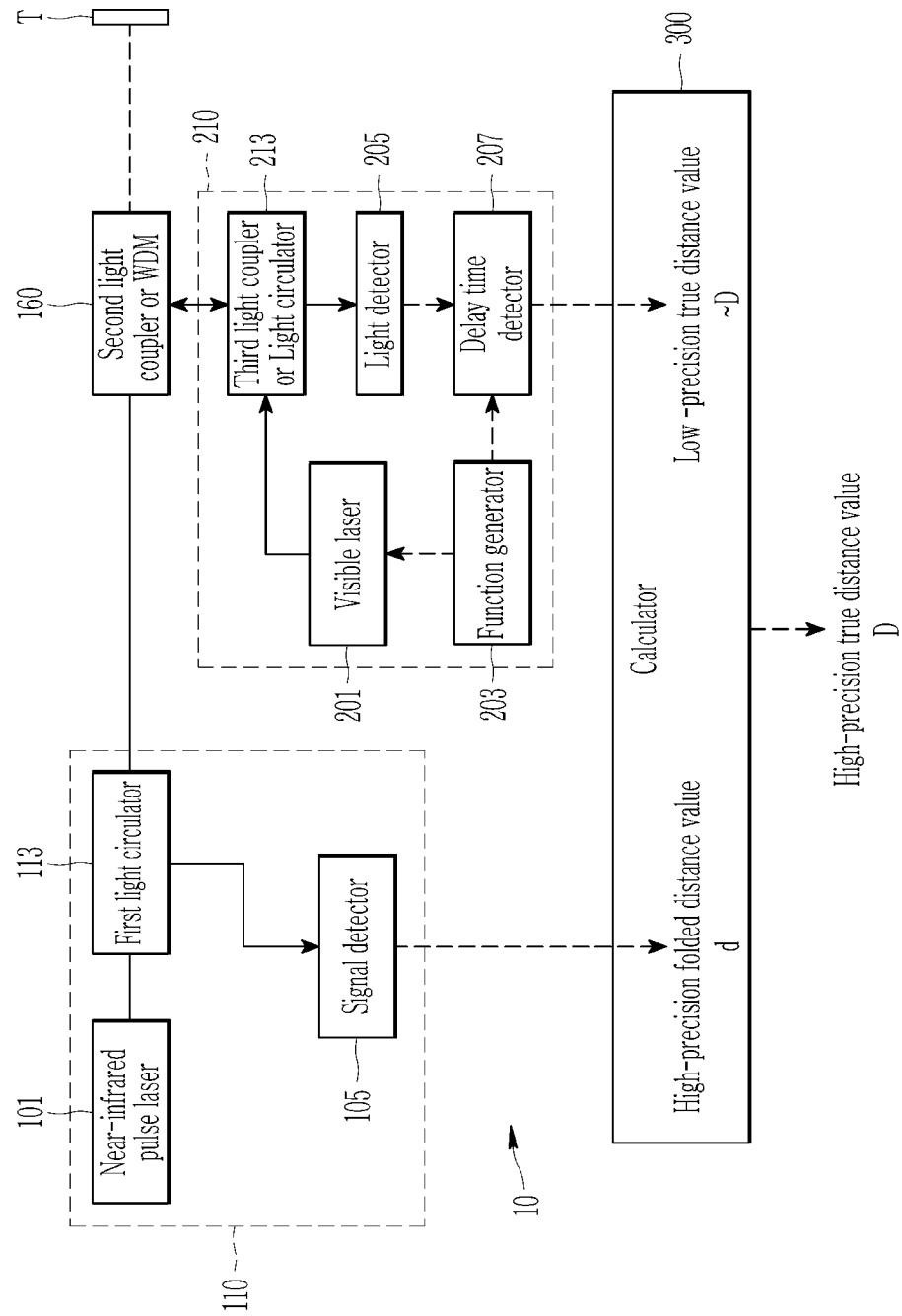
FIG. 1 is a schematic diagram showing an optical system of a distance measuring device according to a first embodiment of the present invention.

Hereinafter, embodiments disclosed in the present specification will be described in detail with reference to the accompanying drawings, but the same or similar reference numerals are assigned to the same or similar elements, and redundant descriptions thereof will be omitted. In addition, in describing embodiments of the present specification, when it is determined that a detailed description of the well-known art associated with the present invention may obscure the gist of the present invention, it will be omitted. Further, the accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various constituent elements, and are not to be interpreted as limiting these constituent elements. The terms are only used to differentiate one constituent element from other constituent elements.

Also, in this specification, it is to be understood that when one component is referred to as being "connected" or "coupled" to another component, it may be connected or coupled directly to another component or may be connected or coupled to another component with the other component intervening therebetween. On the other hand, in this specification, it is to be understood that when one component is referred to as being "connected or coupled directly" to another component, it may be connected or coupled to another component without the other component intervening therebetween.

It will be further understood that terms "comprises" and "have" used in the present specification specify the presence of stated features, numerals, steps, operations, constituent elements, parts, or a combination thereof, but do not preclude the presence or addition of one or more other features, numerals, steps, operations, constituent elements, parts, or a combination thereof.

FIG. 1 is a schematic diagram showing an optical system of a distance measuring device according to first embodiment of the present invention.

Referring to FIG. 1, a distance measuring device 10 according to the present embodiment is a device that measures a distance to a target T by irradiating a laser light to the target T and receiving a reflected light, and includes a near-infrared laser optical system 110 generating a near-infrared electrical signal, a visible laser optical system 210 generating a visible electrical signal, and a calculator 300 receiving these signals to calculate a distance value.

The near-infrared laser optical system 110 generates a near-infrared laser pulse to be emitted toward the target T, and receives the near-infrared laser pulse reflected from the target T to be converted into a near-infrared electrical signal. This converted near-infrared electrical signal may be transferred to the calculator 300.

The near-infrared laser optical system 110 includes a near-infrared pulse laser 101 and a first light coupler 113 connected thereto, and the first light coupler 113 may be respectively connected to a signal detector 105 and second light coupler 160. A light circulator may be used as the first light coupler 113. The near-infrared pulse laser 101 may generate a near-infrared laser pulse and provide it to the first light coupler 113, and the first light coupler 113 may pass the emitted near-infrared laser pulse to provide it to the second light coupler 160. Then, the second light coupler 160 may combine this with visible laser light emitted from the visible laser optical system 210 and irradiate (transmit) it to the target T.

Here, the second light coupler 160 combines the near-infrared laser pulse emitted from the near-infrared laser optical system 110 and the visible laser light emitted from the visible laser optical system 210 as described above to be irradiated to the target T, then receives the light reflected from the target T and transmits it to the near-infrared laser optical system 110 and the visible laser optical system 210. The second light coupler 160 may use a wavelength-division multiplexing (WDM) coupler that may separate and transmit a near-infrared laser pulse and visible laser light.

The first light coupler 113 may receive the near-infrared laser pulse reflected from the target T to change the optical path. That is, the first light coupler 113 may output the reflected near-infrared laser pulse to the signal detector 105 by changing the path in a direction different from the direction in which the near-infrared laser pulse emitted from the near-infrared pulse laser 101 is incident. The signal detector 105 may receive the reflected near-infrared laser pulse to generate the near-infrared electrical signal and transmit it to the calculator 300.

The visible laser optical system 210 generates the visible laser light and emits it toward the target T, and receives the visible laser light reflected from the target T to be converted into a visible electrical signal. The converted visible electrical signal may be transferred to the calculator 300.

The visible laser optical system 210 includes a visible laser 201 and a third light coupler 213 connected thereto, and the third light coupler 213 may be connected to a light detector 205 and the second light coupler 160, respectively. A light circulator may be used as the third light coupler 213. The light detector 205 is connected to a delay time detector 207, and a function generator 203 that generates an electrical signal waveform may be connected to the visible laser 201 and the delay time detector 207, respectively.

The visible laser 201 may generate and emit the visible laser light, the third light coupler 213 may pass the emitted visible laser light to be transmitted to the second light coupler 160, and the second light coupler 160 may combine it to the near-infrared laser light emitted from the near-infrared laser optical system 110 to be irradiated (transmitted) to the target T. Therefore, the third light coupler 213 may provide a guide beam that is visible to the human eye by sending the visible laser light to the target T through the second light coupler 160.

The third light coupler 213 may receive the visible laser light reflected from the target T to change the optical path. That is, the third light coupler 213 may transfer the reflected visible laser to the light detector 205 by changing the path in a direction different from the direction in which the visible laser light emitted from the visible laser 201 is incident. The light detector 205 may receive the reflected visible laser light to generate the visible electrical signal and transmit it to the delay time detector 207.

The function generator 203, which is connected to the visible laser 201 and the delay time detector 207, respectively, may generate a predetermined electrical signal waveform to be provided to the visible laser 201 and transmit the electrical signal waveform generated by this method or generation timing thereof to the delay time detector 207. In other words, the function generator 203 may generate a function signal that may modulate the output or frequency of the visible laser 201 to be provided to the visible laser 201 and provide a signal indicating the timing when the function signal is generated to the delay time detector 207. Therefore, the visible laser 201 may generate the visible laser light to be provided to the third light coupler 213 and receive the function signal from the function generator 203 to modulate the output or frequency of the visible laser 201. The delay time detector 207 may calculate the delayed time of the visible electrical signal by comparing the received electrical signal waveform or the generation timing with the visible electrical signal of the reflected visible laser light transmitted from the light detector 205. That is, the delay time from the function generation timing of the function generator 203 may be detected and provided to the calculator 300.

Figure 2:
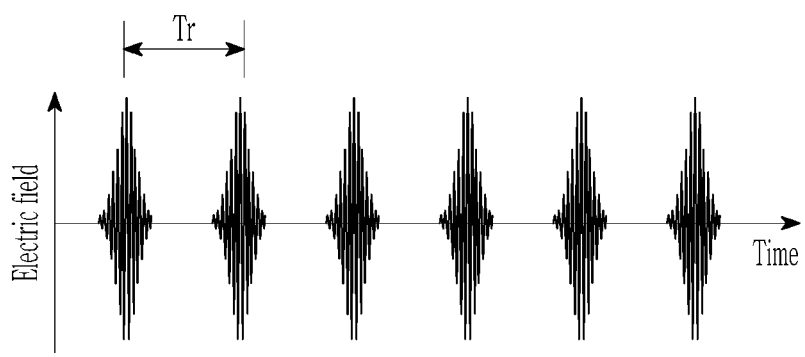
FIG. 2 is a graph showing an intensity of an electric field depending on a time of a near-infrared laser pulse.

As shown in FIG. 2, the near-infrared pulse laser 101 generates the near-infrared laser pulse with a constant period Tr. Due to this periodic characteristic, when a distance is measured using the near-infrared pulse laser, a signal of the same type is generated between the consecutive pulses, and an ambiguity occurs because each signal may not be distinguished. The distance that may be measured without the ambiguity is referred to as an NAR (Non-Ambiguity Range), and an actual distance D may be obtained using the measured distance d and the NAR.

The calculator 300 may receive the visible electrical signal from the visible laser optical system 210 to obtain the first distance value ~D of the first precision of the target T. That is, if the delay time detector 207 calculates the delay time of the visible laser light reflected from the target T and transfers it to the calculator 300, the calculator 300 calculates the distance value for the delay time to obtain ~D. In addition, the calculator 300 may obtain the second distance value d having the second precision of the target T by receiving the near-infrared electrical signal from the near-infrared laser optical system 110. At this time, the second precision becomes higher than the first precision.

Figure 3:
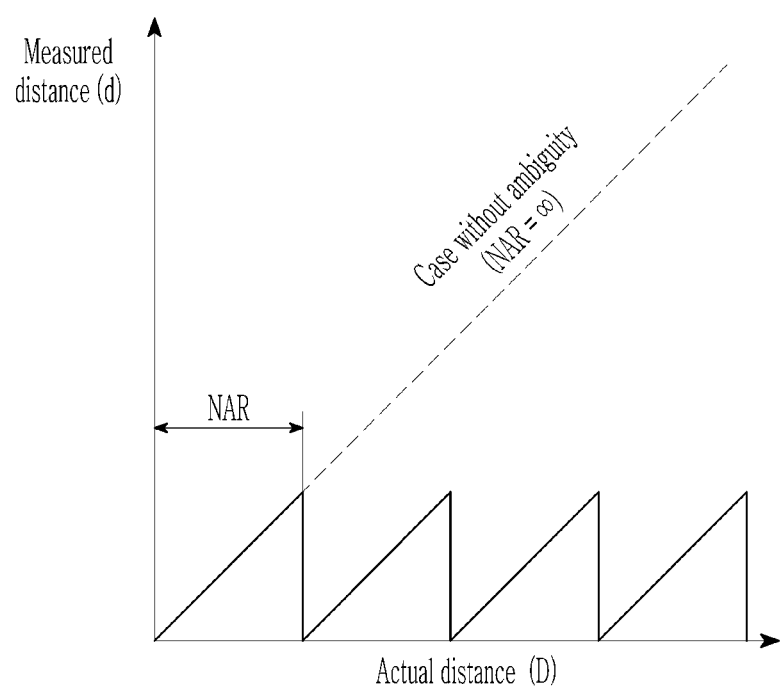
FIG. 3 is a graph showing a relationship between an actual distance and a measured distance according to a presence or absence of an ambiguity.

The distance value measured with the near-infrared laser pulse may be measured with high precision, but due to the periodic characteristic, it appears with the ambiguity in a periodic form like the solid line of FIG. 3. As the distance ~D with low precision is measured even if there is no ambiguity using a visible laser 201 used as the guide beam, an integer value n may be obtained from Equation 1 below. That is, the integer value n corresponds to the number of repetitions of the NAR while measuring the distance to the target and the distance with high precision without ambiguity may be measured by substituting the obtained value n to Equation 2. At this time, the resolution of the distance measurement value measured using the visible laser 201 should be smaller than the NAR measured with the near-infrared pulse laser 101.

Figure 4:
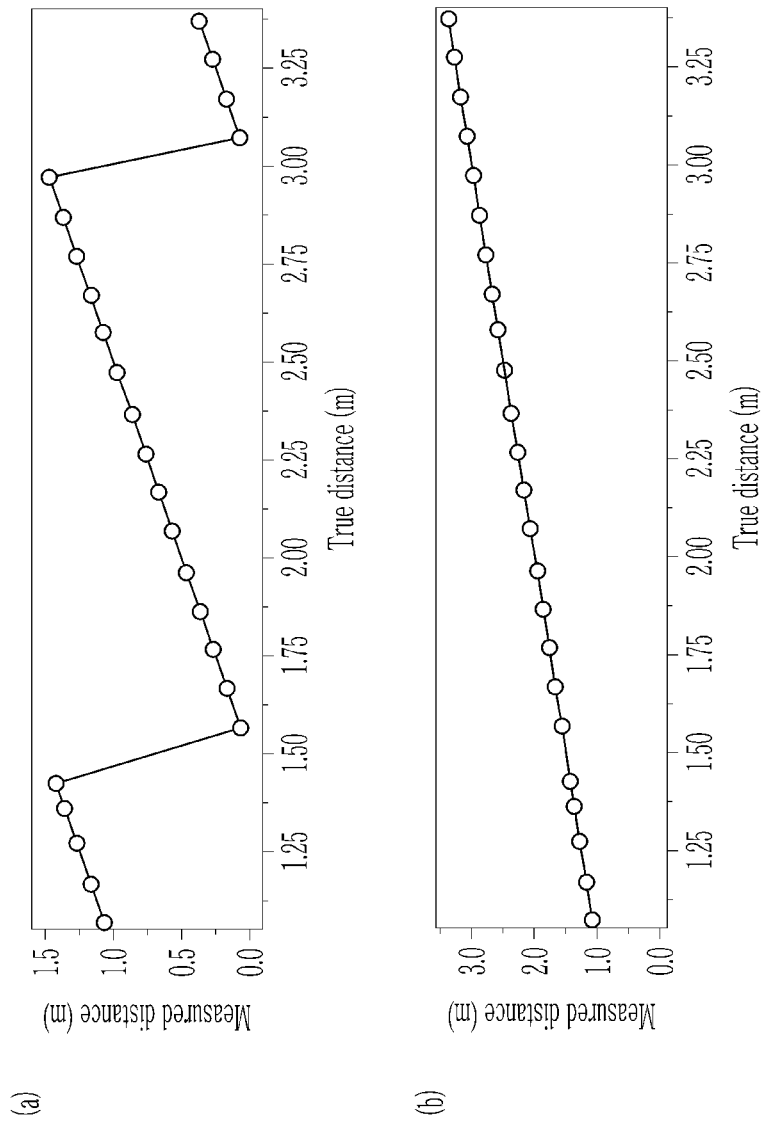
FIG. 4 is a graph shown to explain a high-precision folded distance value.

Therefore, the calculator 300 may calculate the integer value n according to Equation 1 below by using the value ~D and the NAR (Non-Ambiguity Range) and again obtaining the actual distance D according to Equation 2 below by using n, d, and NAR. In this case, the first distance value ~D may be referred to as a low-precision true distance value, the second distance value d may be referred to as a high-precision folded distance value higher than first precision distance value, and the actual distance D may be referred to be a high-precision true distance value. Referring to FIG. 4, the actual distance to be measured is the same as the graph (b), but if the value of which the value n is obtained and multiplied by the NAR is not added, it appears as if to be folded within the NAR as shown in the graph (a).

$$n=[\sim D/\text{NAR}] \qquad \text{[Equation 1]}$$

$$D=n\times\text{NAR}+d \qquad \text{[Equation 2]}$$

That is, in Equation 1, the value n is obtained by taking the integer value of a quotient of the value ~D divided by the NAR, and in Equation 2, the value D is obtained by adding the value d to the value of which the NAR is multiplied by the value n.

Here, [ ] is a floor function, the value ~D is the distance measured in the visible laser optical system, the NAR is a non-ambiguity range constant of the near-infrared laser optical system, the value D is the actual distance, and the value d is the distance measured in the near-infrared laser optical system.

Figure 5:
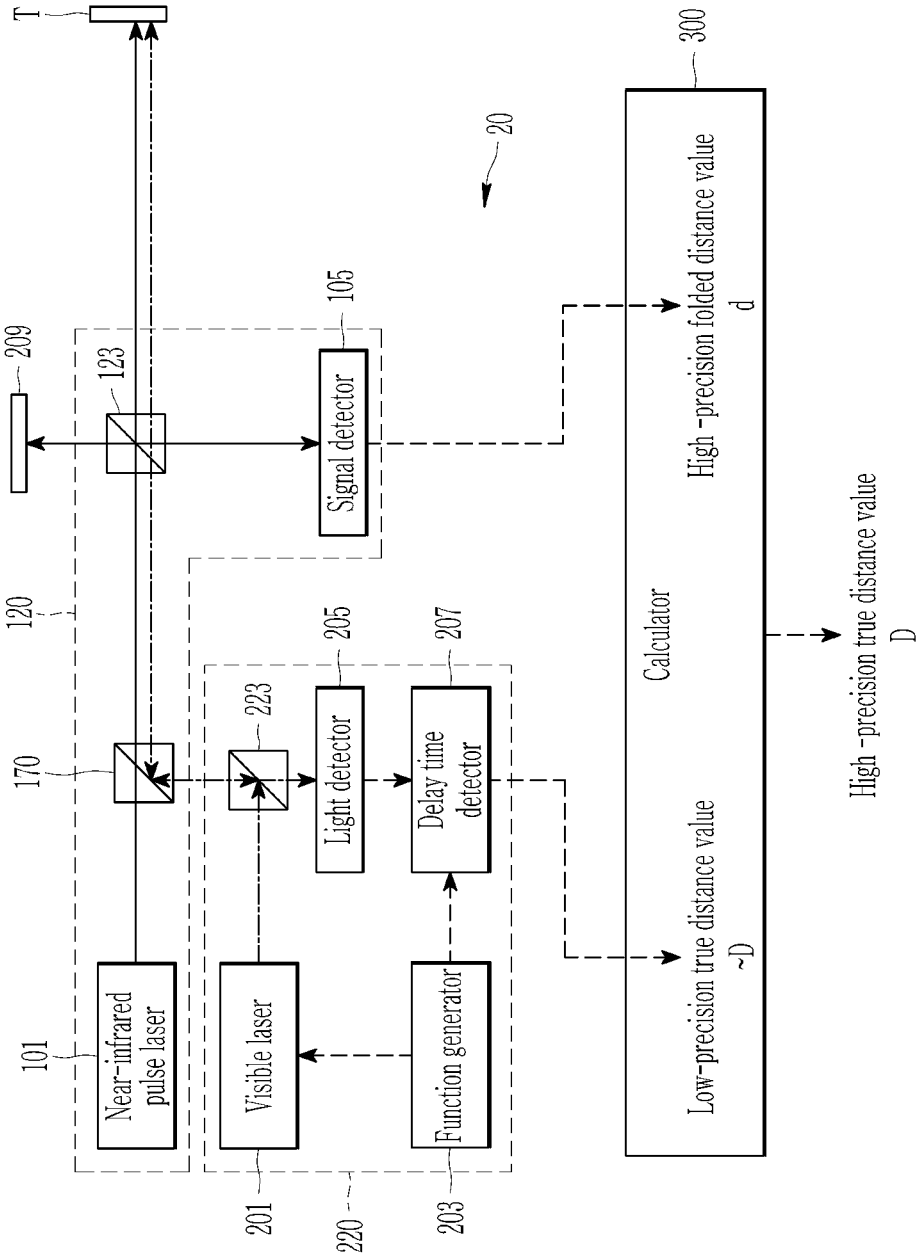
FIG. 5 is a schematic diagram showing an optical system of a distance measuring device according to a second embodiment of the present invention.

FIG. 5 is a schematic diagram showing an optical system of a distance measuring device according to a second embodiment of the present invention.

Referring to FIG. 5, like the first embodiment, the distance measuring device 20 according to the present embodiment includes a near-infrared laser optical system 120 generating the near-infrared electrical signal, a visible laser optical system 220 generating the visible electrical signal, and the calculator 300 calculating the distance value by receiving these signals.

In the present embodiment, a first light divider 170 that passes the near-infrared laser pulse emitted from the near-infrared laser optical system 120 and reflects the visible laser light emitted from the visible laser optical system 220 may be provided.

The near-infrared laser optical system 120 includes a near-infrared pulse laser 101, a first light divider 170 and a second light divider 123 that are connected thereto, and the second light divider 123 may be connected to the signal detector 105 and the first light divider 170, respectively. The near-infrared pulse laser 101 may generate the near-infrared laser pulse to be provided to the second light divider 123 through the first light divider 170. The second light divider 123 may reflect a part of the near-infrared laser pulse provided by the near-infrared pulse laser 101 to be transmitted to a reference plane mirror 209 and pass the other part to be irradiated (transmitted) to the target T.

The second light divider 123 may receive the near-infrared laser pulse reflected from the target T to change the optical path, and may pass the near-infrared laser pulse reflected from the reference plane mirror 209. That is, the second light divider 123 may send the reflected near-infrared laser pulse to the signal detector 105 by changing the path in a direction different from the direction in which the near-infrared laser pulse provided from the near-infrared pulse laser 101 is incident. The signal detector 105 may receive the reflected near-infrared laser pulse to generate the near-infrared electrical signal and transmit it to the calculator 300.

The visible laser optical system 220 includes a visible laser 201 and a third light divider 223 connected thereto, and the third light divider 223 may be connected to the light detector 205 and the first light divider 170, respectively. The light detector 205 is connected to the delay time detector 207, and the function generator 203 that generates the electrical signal waveform may be connected to the visible laser 201 and the delay time detector 207, respectively. The delay time detector 207 may be connected to the calculator 300.

The visible laser 201 may generate and emit the visible laser light and the third light divider 223 may reflect the emitted visible laser light to be provided to the first light divider 170. The first light divider 170 may reflect the provided visible laser light to be irradiated (transmitted) to the target T through the second light divider 123.

The visible laser light reflected from the target T may be received by the second light divider 123 and pass through it and then be reflected by the first light divider 170 to be transmitted to the third light divider 223. The third light divider 223 may receive the reflected visible laser light and provide it to the light detector 205, and the light detector 205 generates it into a visible electrical signal and transmits it to the delay time detector 207.

The function generator 203, which is respectively connected to the visible laser 201 and the delay time detector 207, may generate the predetermined electrical signal waveform to be provided to the visible laser 201 and may transmit the generated electrical signal waveform or its generation timing to the delay time detector 207. The delay time detector 207 compares the received electrical signal waveform or its generation timing with the visible electrical signal of the reflected visible laser light transmitted from the light detector 205 to calculate the delayed time of the visible electrical signal. That is, the delay time from the function generation timing of the function generator 203 may be detected and provided to the calculator 300.

The calculator 300 may obtain the first distance value ~D of the first precision of the target T by receiving the visible electrical signal from the visible laser optical system 220. That is, if the delay time detector 207 calculates the delay time of the visible laser light reflected from the target T and transfers it to the calculator 300, the calculator 300 may calculate the distance value for the delay time to obtain the value ~D. In addition, the calculator 300 may obtain the second distance value d having the second precision of the target T by receiving the near-infrared electrical signal from the near-infrared laser optical system 120. At this time, the second precision becomes higher than the first precision.

Thus, like in the first embodiment, the calculator 300 may use the value ~D and the NAR (Non-Ambiguity Range) to calculate the integer value n according to Equation 1 below, that is, the number of repetitions of the NAR, while measuring the distance to the target, and may calculate the actual distance D according to Equation 2 by using the values n and d and the NAR again.

In the present embodiment, the first light divider 170 is positioned behind the second light divider 123 and accordingly the near-infrared laser pulse and the visible laser light are combined in the first light divider 170 before the second light divider 123, however the first light divider 170 may be positioned more forward (in the direction closer to the target) than the second light divider 123, and in this case, the near-infrared laser pulse and the visible laser light may be combined after the second light divider 123, and this also belongs to the range of the present invention.

Figure 6:
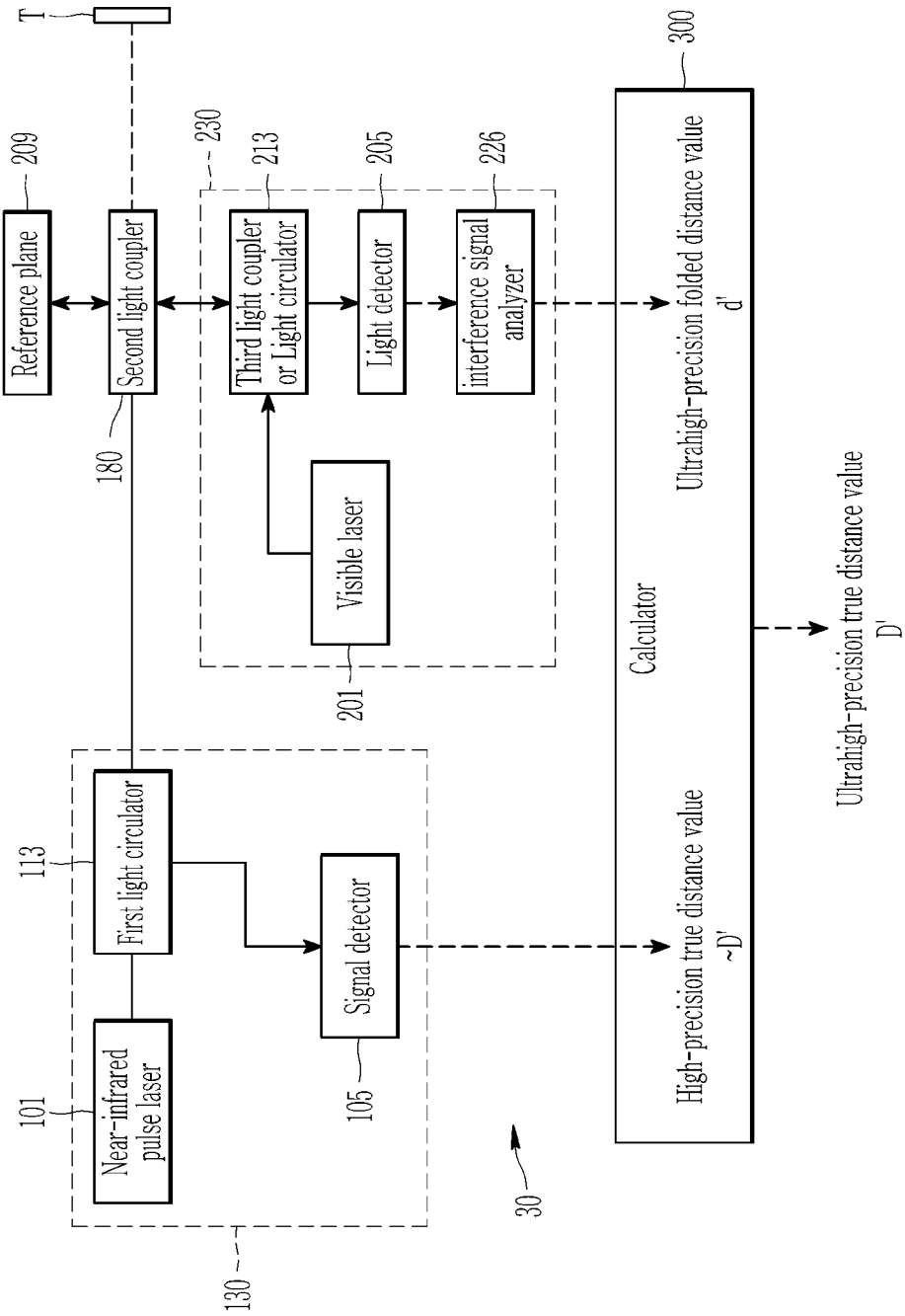
FIG. 6 is a schematic diagram showing an optical system of a distance measuring device according to a third embodiment of the present invention.

FIG. 6 is a schematic diagram showing an optical system of a distance measuring device according to a third embodiment of the present invention.

Referring to FIG. 6, a distance measuring device 30 according to the present embodiment includes the near-infrared laser optical system 130 generating the near-infrared electrical signal, a visible laser optical system 230 generating the visible electrical signal, and the calculator 300 receiving these signals to calculate the distance value.

The near-infrared laser optical system 130 may generate the near-infrared laser pulse to be emitted toward the target T and receive the near-infrared laser pulse reflected from the target T to convert it into the near-infrared electrical signal. This converted near-infrared electrical signal may be transferred to the calculator 300.

The near-infrared laser optical system 130 includes the near-infrared pulse laser 101 and the first light coupler 113 connected thereto, and the first light coupler 113 may be connected to the signal detector 105 and a second light coupler 180, respectively. A light circulator may be used as the first light coupler 113. The near-infrared pulse laser 101 may generate the near-infrared laser pulse to be provided to the first light coupler 113, the first light coupler 113 may pass the emitted near-infrared laser pulse to be provided to the second light coupler 180, and the second light coupler 180 may irradiate (transmit) it to the target T by combining it with the visible laser light emitted from the visible laser optical system 230.

Here, the second light coupler 180 may combine the near-infrared laser pulse emitted from the near-infrared laser optical system 130 and the visible laser light emitted from the visible laser optical system 230 as described above to be irradiated to the target T and receive the light reflected from the target to be transmitted to the near-infrared laser optical system 130 and the visible laser optical system 230.

The first light coupler 113 may receive the near-infrared laser pulse reflected from the target T to change the optical path. That is, the first light coupler 113 may send the reflected near-infrared laser pulse to the signal detector 105 by changing the path in a direction different from the direction in which the near-infrared laser pulse emitted from the near-infrared pulse laser 101 is incident. The signal detector 105 may receive the reflected near-infrared laser pulse to generate the near-infrared electrical signal and provide it to the calculator 300.

The visible laser optical system 230 may generate the visible laser light to emit at least some thereof toward the target T and to reflect at least the other thereof from the reference plane mirror 209, and may convert an interference signal of which the visible laser light reflected from the target T is interfered with the visible laser light reflected from reference plane mirror 209 into the visible electrical signal. The distance value obtained from the converted visible electrical signal may be provided to the calculator 300.

The visible laser optical system 230 includes the visible laser 201 and the third light coupler 213 connected thereto, and the third light coupler 213 may be connected to the light detector 205 and the second light coupler 180, respectively. A light circulator may be used as the third light coupler 213. Also, the second light coupler 180 may be connected to the reference plane mirror 209. The visible laser 201 may generate and emit the visible laser light, the third light coupler 213 may pass the emitted visible laser light to be transmitted to the second light coupler 180, and the second light coupler 180 combines it with the near-infrared laser light emitted from the near-infrared laser optical system 130 to be irradiated (transmitted) to the target T. Therefore, the third light coupler 213 may provide a guide beam that is visible to the human eye by sending the visible laser light to the target T through the second light coupler 180.

The third light coupler 213 may receive the visible laser light reflected from the target T to change the optical path. That is, the third light coupler 213 may transfer the reflected visible laser light to the light detector 205 by changing the path in a direction different from the direction in which the visible laser light emitted from the visible laser 201 is incident. Therefore, the third light coupler 213 may provide the visible laser light reflected from the reference plane mirror 209 and the visible laser light reflected from the target T to the light detector 205. The light detector 205 may convert the interference signal of which the visible laser light reflected from the reference plane mirror 209 and the visible laser light reflected from the target T are received and interfered into the visible electrical signal and transmit it to an interference signal analyzer 226. The interference signal analyzer 226 may receive the visible electrical signal from the light detector 205 to calculate the third distance value and transmit it to the calculator 300.

The calculator 300 may receive the near-infrared electrical signal from the near-infrared laser optical system 130 to obtain the second distance value ~D' of the second precision of the target T. In addition, the calculator 300 may receive a third distance value d' having the third precision of the target T obtained from the visible electrical signal from the visible laser optical system 230. At this time, the third precision becomes higher than the second precision.

Thus, the calculator 300 may uses the value ~D' and the NAR' to calculate the integer value n according to Equation 3 below, that is, the number of repetitions of the NAR' while measuring the distance to the target, and may calculate the actual distance D' according to Equation 4 by using the values n and d' and the NAR' again. In this case, the second distance value ~D' may be referred to as a high-precision true distance value, the third distance value d' may be referred to as an ultrahigh-precision folded distance value higher than the second precision, and the actual distance D' may be referred to as an ultrahigh-precision true distance value.

$$n=[\sim D'/NAR'] \qquad \text{[Equation 3]}$$

$$D'=n\times NAR+d' \qquad \text{[Equation 4]}$$

That is, in Equation 3, the value n is obtained by taking the integer value of a quotient of the value ~D' divided by the NAR', and in Equation 4, the value D' is obtained by adding the value d' to the value of which the NAR' is multiplied by the value n.

Here, [ ] is a floor function, the value ~D' is the distance measured in the near-infrared laser optical system, the NAR' is a is a non-ambiguity range constant of the visible laser optical system, the value D' is the actual distance, and the value d' is the distance measured in the visible laser optical system.

The visible light guide beam may measure the distance with a higher resolution than the near-infrared pulse laser distance measurement by using a heterodyne or homodyne interferometer principle. However, the ambiguity occurs when the heterodyne or homodyne interferometer principle is applied, and here, since the distance that may be measured without the ambiguity is shorter than the distance measured by using the near-infrared pulse laser, it is combined with the distance value measured by using the near-infrared pulse laser, thereby obtaining a longer area that may be measured without the ambiguity and high resolution.

Figure 7:
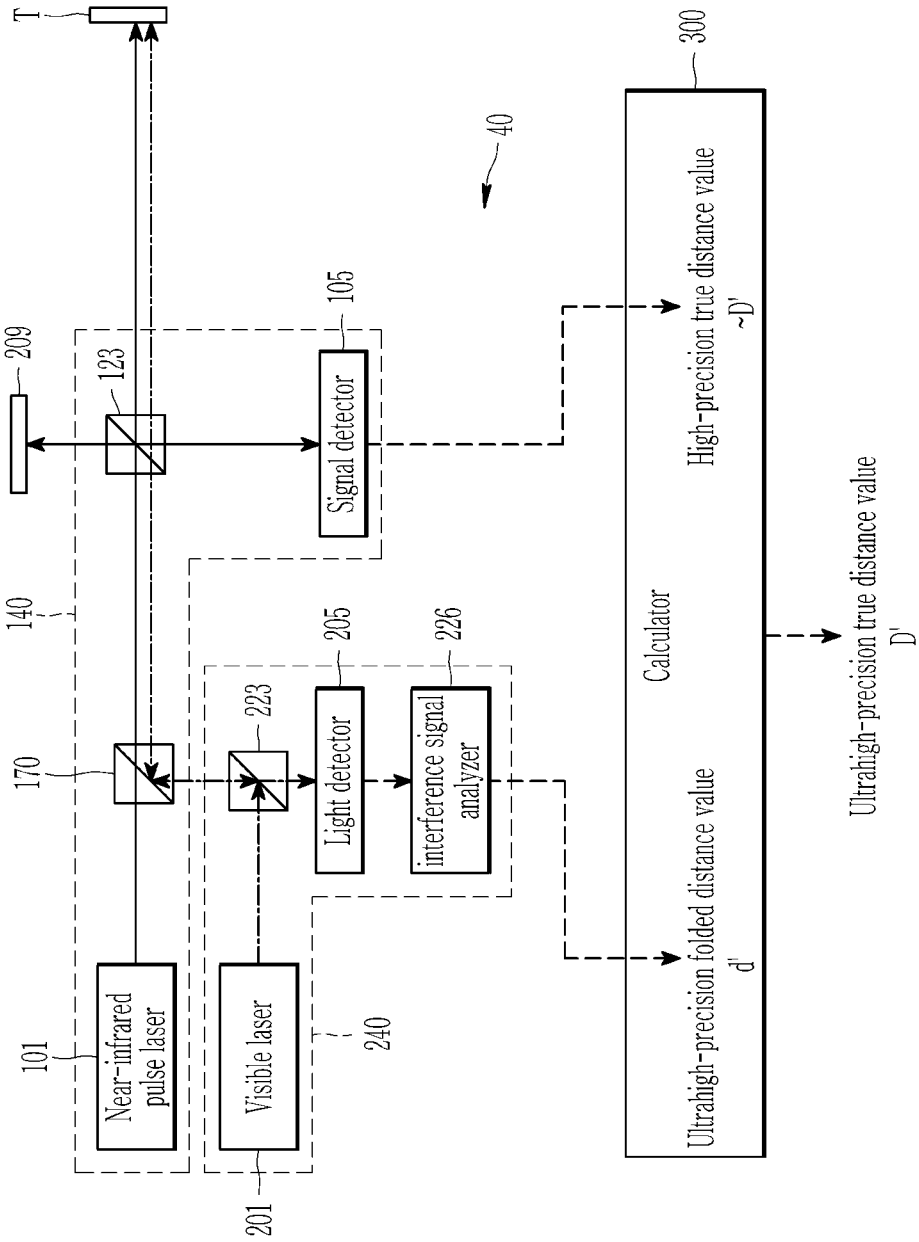
FIG. 7 is a schematic diagram showing an optical system of a distance measuring device according to a fourth embodiment of the present invention.

FIG. 7 is a schematic diagram showing an optical system of a distance measuring device according to a fourth embodiment of the present invention.

Referring to FIG. 7, like the third embodiment, a distance measuring device 40 according to the present embodiment includes a near-infrared laser optical system 140 generating the near-infrared electrical signal, a visible laser optical system 240 generating the visible electrical signal, and the calculator 300 calculating the distance value by receiving these signals.

In the present embodiment, the first light divider 170 that passes the near-infrared laser pulse emitted from the near-infrared laser optical system 140 and reflects the visible laser light emitted from the visible laser optical system 240 may be provided.

The near-infrared laser optical system 140 includes the near-infrared pulse laser 101, the first light divider 170, and the second light divider 123 that are connected thereto, and the second light divider 123 may be connected to the signal detector 105 and the first light divider 170, respectively. The near-infrared pulse laser 101 may generate the near-infrared laser pulse to be provided to the second light divider 123 through the first light divider 170. The second light divider 123 may reflect a part of the near-infrared laser pulse provided by the near-infrared pulse laser 101 to be transmitted to the reference plane mirror 209 and pass the other part to be irradiated (transmitted) to the target T.

The second light divider 123 may receive the near-infrared laser pulse reflected from the target T to change the optical path and may pass the near-infrared laser pulse reflected from the reference plane mirror 209. That is, the second light divider 123 may send the reflected near-infrared laser pulse to the signal detector 105 by changing the path in a direction different from the direction in which the near-infrared laser pulse provided from the near-infrared pulse laser 101 is incident. The signal detector 105 may receive the reflected near-infrared laser pulse to generate the near-infrared electrical signal, and may transmit it to the calculator 300.

The visible laser optical system 240 includes a visible laser 201 and a third light divider 223 connected thereto, and the third light divider 223 may be connected to the light detector 205 and the first light divider 170, respectively. The light detector 205 may be connected to the interference signal analyzer 226 and the interference signal analyzer 226 may be again connected to the calculator 300.

The visible laser 201 may generate and emit the visible laser light, and the third light divider 223 may reflect the emitted visible laser light to be provided to the first light divider 170. The first light divider 170 may reflect the provided visible laser light to provide the second light divider 123, and the second light divider 123 may pass a part thereof to be transmitted to the reference plane mirror 209 and may pass the other part to be irradiated (transmitted) to the target T.

The visible laser light reflected from the target T may be again received by the second light divider 123 and pass through it, and then may be reflected by the first light divider 170 to be transmitted to the third light divider 223. Also, the visible laser light reflected from the reference plane mirror 209 may be reflected from the second light divider 123 to be provided to the first light divider 170, and the first light divider 170 may again reflect it to be transmitted to the third light divider 223.

The third light divider 223 may pass the visible laser light respectively reflected from the reference plane mirror 209 and the target T to be provided to the light detector 205. The light detector 205 may convert an interference signal of which the visible laser light respectively reflected from the reference plane mirror 209 and the target T is received and interfered into the visible electrical signal, and may transmit it to the interference signal analyzer 226. The interference signal analyzer 226 may receive the visible electrical signal of which the interference signal is converted to calculate a third distance value and may transmit it to the calculator 300.

The calculator 300 may receive the near-infrared electrical signal from the near-infrared laser optical system 140 to obtain the second distance value ~D' of the second precision of the target T. Also, the calculator 300 may receive the visible electrical signal from the visible laser optical system 240 to obtain the third distance value d' having the third precision of the target T. In this case, the third precision becomes higher than the second precision.

Thus, the calculator 300 may uses the value ~D' and the NAR' to calculate the integer value n according to Equation 3 above, that is, the number of repetitions of the NAR while measuring the distance to the target, and may calculate the actual distance D' according to Equation 4 by using the values n and d' and the NAR' again.

In the present embodiment, the first light divider 170 is positioned behind the second light divider 123, and accordingly, the near-infrared laser pulse and the visible laser light are combined in the first light divider 170 before the second light divider 123, however the first light divider 170 may be disposed before the second light divider 123 (a direction closer to the target), and in this case, the near-infrared laser pulse and the visible laser light may be combined after the second light divider 123, and this also belongs to the range of the present invention.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

[Description of symbols]

| | |
|---|---|
| 10, 20, 30, 40: distance measuring device | |
| 110, 120, 130, 140: near-infrared laser optical system | |
| 210, 220, 230, 240: visible laser optical system | |
| 101: near-infrared pulse laser | 105: signal detector |
| 113: first light coupler | 123: second light divider |
| 160: second light coupler | 170: first light divider |
| 201: visible laser | 203: function generator |
| 205: light detector | 207: delay time detector |
| 209: reference plane mirror | 213: third light coupler |
| 223: third light divider | 226: interference signal analyzer |
| 300: calculator | T: target |

The invention claimed is:

1. A distance measuring device for measuring an actual distance to a target comprising:
a near-infrared laser optical system generating a near-infrared laser pulse having a predetermined NAR (Non-Ambiguity Range) constant to be emitted toward the target and receiving the near-infrared laser pulse reflected from the target to be converted into a near-infrared electrical signal;
a visible laser optical system generating visible laser light to be emitted toward the target and receiving the visible laser light reflected from the target to be converted into a visible electrical signal; and
a calculator calculating a first distance value from the visible electrical signal, calculating a second distance value from the near-infrared electrical signal, obtaining an integer value of a quotient of dividing the first distance value by the NAR constant as a number of repetitions of the NAR constant over the actual distance to the target, and calculating the actual distance to the target by using the number of repetitions, the NAR constant, and the second distance value.

2. The distance measuring device of claim 1, wherein the calculator calculates the actual distance to the target by adding the value calculated by multiplying the NAR constant by the number of repetitions to the second distance value.

3. The distance measuring device of claim 1, wherein the near-infrared laser optical system includes:
a near-infrared pulse laser generating the near-infrared laser pulse to be emitted;
a first light coupler passing the emitted near-infrared laser pulse and receiving the reflected near-infrared laser pulse to change an optical path; and
a signal detector receiving the reflected near-infrared laser pulse to generate and transmit the near-infrared electrical signal to the calculator.

4. The distance measuring device of claim 3, further comprising
a second light coupler combining the near-infrared laser pulse emitted from the near-infrared laser optical system and the visible laser light emitted from the visible laser optical system to be irradiated to the target and receiving light reflected from the target to be divided into and transmit the near-infrared laser pulse and the visible laser light.

5. The distance measuring device of claim 4, wherein the visible laser optical system includes:
a visible laser generating and emitting the visible laser light;
a third light coupler passing the emitted visible laser light and receiving the reflected visible laser light to change an optical path;
a light detector receiving the reflected visible laser light transmitted from the third light coupler to generate the visible electrical signal;
a function generator generating a predetermined electrical signal waveform to be provided to the visible laser; and
a delay time detector receiving the visible electrical signal from the light detector and receiving the electrical signal waveform or generation timing thereof from the function generator to calculate and transmit a delayed time of the visible electrical signal to the calculator.

6. The distance measuring device of claim 1, further comprising
a first light divider passing the near-infrared laser pulse emitted from the near-infrared laser optical system and reflecting the visible laser light emitted from the visible laser optical system.

7. The distance measuring device of claim 6, wherein the near-infrared laser optical system includes:
a near-infrared pulse laser generating the near-infrared laser pulse to be emitted;
a second light divider reflecting a part of the emitted near-infrared laser pulse to be transmitted to the reference plane mirror, passing the other part to be irradiated to the target, and receiving the near-infrared laser pulse reflected from the target to change an optical path; and
a signal detector receiving the near-infrared laser pulse reflected from the target and the near-infrared laser pulse reflected from the reference plane mirror to generate and transmit the near-infrared electrical signal to the calculator.

8. The distance measuring device of claim 7, wherein the visible laser optical system includes:
a visible laser generating and emitting the visible laser light;
a third light divider reflecting the emitted visible laser light and passing the reflected visible laser light;
a light detector receiving the reflected visible laser light transmitted from the third light divider to generate the visible electrical signal;
a function generator generating a predetermined electrical signal waveform to be provided to the visible laser; and
a delay time detector receiving the visible electrical signal from the light detector and receiving the electrical signal waveform or generation timing thereof from the function generator to calculate and transmit a delayed time of the visible electrical signal to the calculator.

9. A distance measuring device for measuring an actual distance to a target, comprising:
a near-infrared laser optical system generating a near-infrared laser pulse to be emitted toward the target and receiving the near-infrared laser pulse reflected from the target to be converted into a near-infrared electrical signal;
a visible laser optical system generating visible laser light having a predetermined NAR (Non-Ambiguity Range) constant to emit at least a part toward the target and reflecting at least the other part from a reference plane mirror and converting an interference signal of which the visible laser light reflected from the target is interfered with the visible laser light reflected from the reference plane mirror into a visible electrical signal; and
a calculator calculating a second distance value from the near-infrared electrical signal, calculating a third distance value from the visible electrical signal, obtaining an integer value of a quotient of dividing the second distance value by the NAR constant as a number of repetitions of the NAR constant over the actual distance to the target, and calculating the actual distance to the target by using the number of repetitions, the NAR constant, and the third distance value.

10. The distance measuring device of claim 9, wherein the calculator calculates the actual distance to the target by adding the value calculated by multiplying the NAR constant by the number of repetitions to the third distance value.

11. The distance measuring device of claim 9, wherein the near-infrared laser optical system includes:
a near-infrared pulse laser generating and emitting the near-infrared laser pulse;
a first light coupler passing the emitted near-infrared laser pulse and receive the reflected near-infrared laser pulse to change an optical path; and
a signal detector receiving the reflected near-infrared pulse laser of which the path is changed in the first light coupler and generating the near-infrared electrical signal to be transmitted to the calculator.

12. The distance measuring device of claim 11, further comprising
a second light coupler combining the near-infrared laser pulse emitted from the near-infrared laser optical system and the visible laser light emitted from the visible laser optical system to be irradiated to the target and receiving the light reflected from the target to be divided into and transmit the near-infrared laser pulse and the visible laser light.

13. The distance measuring device of claim 12, wherein the visible laser optical system includes:
a visible laser generating and emitting the visible laser light;
a third light coupler passing the emitted visible laser light and receiving the visible laser light reflected from the target to change an optical path;

a light detector converting an interference signal of which the visible laser light reflected from the reference plane mirror and the visible laser light reflected from the target are received and interfered into the visible electrical signal; and an interference signal analyzer receiving the visible electrical signal from the light detector to calculate and provide the third distance value to the calculator.

14. The distance measuring device of claim 9, further comprising a first light divider passing the near-infrared laser pulse emitted from the near-infrared laser optical system and reflecting the visible laser light emitted from the visible laser optical system.

15. The distance measuring device of claim 14, wherein the near-infrared laser optical system includes:

a near-infrared pulse laser generating and emitting the near-infrared laser pulse;

a second light divider reflecting a part of the emitted near-infrared laser pulse to be transmitted to the reference plane mirror, passing another part to be irradiated to the target, and receiving the reflected near-infrared laser pulse from the target to change an optical path; and a signal detector receiving the near-infrared laser pulse reflected from the target and the near-infrared laser pulse reflected from the reference plane mirror to generate and transmit the near-infrared electrical signal to the calculator.

16. The distance measuring device of claim 14, wherein the visible laser optical system includes:

a visible laser generating and emitting the visible laser light;

a second light divider reflecting a part of the emitted visible laser light to be transmitted to the reference plane mirror and passing the other part to be irradiated to the target;

a third light divider reflecting the emitted visible laser light and passing the visible laser light respectively reflected from the reference plane mirror and from the target;

a light detector converting an interference signal of which the visible laser light respectively reflected from the reference plane mirror and the target is received and interfered into the visible electrical signal; and an interference signal analyzer receiving the visible electrical signal from the light detector to calculate and transmit the third distance value to the calculator.

17. A distance measuring method for measuring an actual distance to a target, comprising:

generating a near-infrared laser pulse having a predetermined NAR (Non-Ambiguity Range) constant to be emitted toward the target and receiving the near-infrared laser pulse reflected from the target to be converted into a near-infrared electrical signal;

generating visible laser light to be emitted toward the target and receiving the visible laser light reflected from the target to be converted into a visible electrical signal; and calculating a first distance value from the visible electrical signal, calculating a second distance value from the near-infrared electrical signal, obtaining an integer value of a quotient of dividing the first distance value by the NAR constant as a number of repetitions of the NAR constant during over the actual distance to the target, and calculating the actual distance to the target by using the number of repetitions, the NAR constant, and the second distance value.

18. A distance measuring method for measuring an actual distance to a target, comprising:

generating a near-infrared laser pulse to be emitted toward the target and receiving the near-infrared laser pulse reflected from the target to be converted into a near-infrared electrical signal;

generating visible laser light having a predetermined NAR (Non-Ambiguity Range) constant, emitting at least a part toward the target, and reflecting at least the other part from a reference plane mirror, and converting an interference signal of which the visible laser light reflected from the target is interfered with the visible laser light reflected from the reference plane mirror into the visible electrical signal; and calculating a second distance value from the near-infrared electrical signal, calculating a third distance value from the visible electrical signal, obtaining an integer value of a quotient of dividing the second distance value by the NAR constant as a number of repetitions of the NAR constant over the actual distance to the target, and calculating the actual distance to the target by using the number of repetitions, the NAR constant, and the third distance value.

* * * * *